(12) United States Patent
Shaw et al.

(10) Patent No.: US 12,109,797 B2
(45) Date of Patent: Oct. 8, 2024

(54) LIQUID-ABSORBING BARRIER BAG WITH ADHERED SWELLING ABSORBENT

(71) Applicant: Ultratech International, Inc., Jacksonville, FL (US)

(72) Inventors: Mark D. Shaw, Ponte Vedra Beach, FL (US); Paul Sander, Jacksonville, FL (US)

(73) Assignee: ULTRATECH INTERNATIONAL, INC., Jacksonville, FL (US)

( * ) Notice: Subject to any disclaimer, the term of this patent is extended or adjusted under 35 U.S.C. 154(b) by 14 days.

(21) Appl. No.: 18/125,925

(22) Filed: Mar. 24, 2023

(65) Prior Publication Data

US 2023/0302768 A1    Sep. 28, 2023

Related U.S. Application Data

(60) Provisional application No. 63/323,708, filed on Mar. 25, 2022.

(51) Int. Cl.
| | |
|---|---|
| *B32B 7/12* | (2006.01) |
| *B32B 3/26* | (2006.01) |
| *B32B 5/02* | (2006.01) |
| *B65D 81/26* | (2006.01) |

(52) U.S. Cl.
CPC .............. *B32B 7/12* (2013.01); *B65D 81/264* (2013.01); *B32B 3/266* (2013.01); *B32B 5/024* (2013.01); *B32B 2307/7166* (2013.01); *B32B 2307/726* (2013.01); *B32B 2307/7265* (2013.01); *B32B 2439/06* (2013.01)

(58) Field of Classification Search
CPC .......... B32B 3/266; B32B 5/02; B32B 5/024; B32B 7/12; B32B 2307/7166; B32B 2307/726; B32B 2307/7265; B65D 81/26; B65D 81/264
USPC ............................ 206/204; 405/18, 107–115
See application file for complete search history.

(56) References Cited

U.S. PATENT DOCUMENTS

| | | | |
|---|---|---|---|
| 4,362,433 A | 12/1982 | Wagner et al. | |
| 4,650,368 A | 3/1987 | Bayer | |
| 9,539,158 B2 * | 1/2017 | Cassidy | ................. A61G 9/006 |
| 2002/0168227 A1 * | 11/2002 | Rubin, Jr. | ............... E02B 3/127 |
| | | | 405/17 |

* cited by examiner

*Primary Examiner* — Bryon P Gehman
(74) *Attorney, Agent, or Firm* — Thomas C. Saitta

(57) ABSTRACT

A liquid-absorbing, liquid barrier bag comprising a liquid-permeable envelope within which a super-absorbent material in powder or granular form is disposed, the absorbent material being characterized in that it greatly increases in volume upon liquid absorption. The super-absorbent material is adhered to one or more of the inner surfaces of the liquid-permeable envelope such that the desired distribution and pattern is maintained during handling, shipping and activation of the liquid-absorbing. Upon contact with liquid, such as by soaking the bag in water, the super-absorbent material releases from the inner surfaces and swells to create a three-dimensional body suitable for stacking to form a liquid-impermeable barrier wall.

20 Claims, 3 Drawing Sheets

LIQUID-ABSORBING BARRIER BAG WITH ADHERED SWELLING ABSORBENT

BACKGROUND

This invention relates generally to the field of discrete bodies used to form liquid impermeable barrier walls, such as for example sandbags which are combined to build a dam, sometimes referred to as flood water containment or barrier bags, and more particularly relates to such bodies wherein the filler material is a liquid rather than sand. The invention is better defined as liquid-absorbing barrier bags which comprise an absorbent material retained within a liquid permeable envelope, wherein the absorbent material swells or expands upon being soaked or immersed in water into a suitable shape and size for construction of a liquid-impermeable barrier wall or dam, or wherein the absorbent material swells or expands upon contact with the liquid sought to be dammed, redirected or retained after the dry barrier bags have been pre-positioned to form a barrier wall.

The use of sandbags, discrete bodies comprising a sand-filled envelope, to construct a dam or levee to hold back water or other liquids is well known. The sandbags are most commonly used in emergency circumstances, such as predicted heavy flooding due to excessive rainfall or breeches in liquid containment vessels or pipelines, whereupon a large number of sandbags are stacked to form a liquid-impermeable barrier wall. A major problem with sandbags is that they are stored empty to conserve space and to provide for easy transport to the site where they are needed, where they must be filled with sand, concrete or a similarly heavy material prior to stacking, and then individually stacked by hand. Sand may not be readily available and travel time to obtain sand can be disadvantageous in a flooding circumstance, and the filling of the bags is a time-consuming and labor-intensive process. In some cases, sand may be unavailable when or where needed.

One alternative to sandbags is to provide bladder-type barrier bags, i.e., liquid-impermeable bags, that are designed to be filled with water instead of sand prior to construction of the barrier wall, but this design has drawbacks in that in addition to the requirement that a water source be available on site and the bags must be filled individually with a hose.

An improved liquid barrier bag, as disclosed in U.S. Pat. No. 4,650,368, comprises an absorbent material disposed within a liquid-permeable envelope. This allows lightweight, dry barrier bags to be stored, transported, pre-soaked with water to expand them three-dimensionally, and then stacked on the ground at the desired location to restrict liquid flow. The preferred absorbent material is described in the '368 patent as a super-absorbent material which is capable of rapidly absorbing from 50-1000 times its own weight in water. The preferred superabsorbent material is a polymer that swells to form a gel upon contact with water. In many instances the absorbent material comprises a powder in dry form, and when enclosed within the liquid-permeable envelope it is free to migrate, shift or gather within the bag such that an even distribution of powder within the bag is not present when the bag is soaked and stacked. If the distribution of absorbent material is too uneven, the bags will not develop the required substantially rectangular or pillow-shaped configuration necessary to create a liquid-impermeable barrier wall when stacked. The use of loose absorbent material presents an even greater migration problem when the barrier bags are formed as elongated bags or tubes, such as are used to seal the bottoms of doorways, garage doors or commercial roll-up doors, which may be for example 12 feet in length or longer. The absorbent polymer easily collects in one or both ends of elongated bags or tubes during shipping and handling.

This problem has been addressed in several ways, none of which present optimum solutions. One solution is to fill each barrier bag with a fibrous material within which the loose super-absorbent polymer material is evenly distributed. This design presents complicated manufacturing issues, increases storage and shipping costs due to its thickness, and adds raw material costs to the end product. The '368 patent addresses this problem by disclosing that the absorbent material may be laminated to a paper or non-woven material which is then placed inside the bag. In similar manner, it is known to provide two adjoined sheets of cellulose sheeting disposed in a "waffle-like" pattern on the sheeting to form pockets into which the absorbent material is placed. In other designs, the absorbent material rests loosely in a waffle-like pattern of soluble paper. Packaging, handling and shipping of the barrier bag can result in the absorbent particles shifting from the pockets to accumulate in the ends or edges of the barrier bag. The labor of heat-sealing or sewing these two sheets together adds significant material and labor costs, potentially doubling the final costs of the end product. Thus, the known liquid-filled barrier bags suffer from inconsistent performance, difficult manufacturing and/or excessive costs for materials and labor.

It is an object of this invention to provide an improved liquid-filled barrier bag which comprises an absorbent material in powder or particulate form encased within a liquid-permeable bag, tube or envelope, the absorbent material being a super-absorbent material or super-absorbent polymer (SAP), characterized in that is capable of absorbing a large volume of liquid which passes through the walls of the permeable bag, such as for example from 50 to 1000 times its weight in liquid, the absorbent material swelling within the bag as the liquid is absorbed. In this manner the dry barrier bags are easily charged, i.e., soaked in water to cause expansion of the barrier bag into its useful three-dimensional shape, and then stacked in rows such that a liquid-impermeable barrier wall is produced. In some circumstances where the liquid to be dammed, redirected or retained is slowly rising, the bags may be stacked in the dry state to form a self-rising barrier wall, as they will swell and increase in height upon contact with the rising liquid. It is a further object to provide such an improved barrier bag wherein the absorbent material is adhered to one or more inner surfaces of the bag in an evenly distributed or patterned manner to preclude migration of the dry super-absorbent material within the bag, such that once filled with liquid the expanded bag assumes the shape, configuration and functionality of a standard sandbag. It is a further object of the invention to utilize either a liquid-soluble or a liquid-insoluble but weak-bonding adhesive to retain the absorbent material, the adhesive releasing the absorbent material upon contact with the soaking liquid, either due to the dissolving of the liquid-soluble adhesive or as a result of the absorbent material physically detaching itself upon swelling.

SUMMARY OF THE INVENTION

In general, the invention in various embodiments is a liquid-absorbing, liquid barrier bag comprising a liquid-permeable envelope within which a liquid-absorbing material in powder or granular form is disposed, the absorbent material being a super-absorbent polymer characterized in that it greatly increases in volume upon liquid absorption.

The absorbent material is initially adhered to one or more of the inner surfaces of the liquid-permeable envelope. The envelope is closed or sealed on all sides or edges along or adjacent its periphery, such that the interior area of the envelope is able to separate and expand when the absorbent material expands from the absorption of liquid passing through the walls of the envelope. Once the absorbent material is fully saturated and fully expanded, the barrier bag precludes passage of liquid through the bag.

The absorbent material is preferably a super-absorbent polymer characterized in that it absorbs a large amount of liquid, such as preferably from 50 to 1000 times its weight in liquid, the polymer swelling and expanding significantly into a gel or cross-linked body as the liquid is absorbed. In this manner the volume of the barrier bag increases from a generally flat configuration (prior to contact with liquid) to a substantially rectangular, pillow-shaped or an elongated tubular configuration (after contact with liquid). By adhering the absorbent material to the inner surface or surfaces of the envelope, the polymer or other material remains evenly distributed or distributed inside the envelope in a predetermined pattern during storage, transport, pre-soaking and placement. The adhesive used to adhere the absorbent material onto the inner wall of the envelope may be any of a water-soluble or weak-bonding type, such that the absorbent material separates from the envelope wall upon swelling to completely fill the envelope once fully saturated.

With this construction, a barrier wall may be formed by soaking the dry barrier bags onsite using any available water source, such as by soaking them in a bucket or pool or in a natural body of water, to produce the desired three-dimensional shape for stacking. The enlarged bags of rectangular shape are then stacked to produce a barrier wall or dam, or elongated bags of tubular shape are placed along door bottoms to provide a seal.

Alternatively, in circumstances where the liquid to be dammed, redirected or retained will be slow rising, a plurality of flat, dry barrier bags may be stacked in multiple rows at the desired location for the formation of a wall to retain or restrict the flow of liquid, with each row preferably staggered or offset from its adjacent row. The bags may be secured in place on the ground surface using stakes, anchors, tiedowns or other means. Once the liquid contacts the barrier bags it passes through the bag wall into the interior of the bag and is absorbed by the expandable absorbent material. The flat bags then increase in size in the vertical direction to form a pillow-shaped, tubular or other three-dimensional body, thereby producing in combination a liquid-impermeable barrier wall in the same style as that of typical sandbags.

In alternative language, the invention is a liquid-absorbing barrier bag comprising: a liquid-permeable envelope having an inner surface; an adhesive disposed on the inner surface of the liquid-permeable envelope; and a liquid-absorbing material adhered to the inner surface of the liquid-permeable envelope by the adhesive, the liquid-absorbing material characterized in that it expands upon contact with liquid; whereby upon expansion of the liquid-absorbing material, passage of liquid through the liquid-absorbing barrier bag is precluded. Furthermore, such a barrier bag wherein the liquid-absorbing material is a powdered or granular material; wherein the adhesive is water-soluble; wherein the liquid-absorbing material separates from the inner surface of the liquid-permeable envelope upon absorption of liquid; wherein the liquid-absorbing material completely fills the liquid-permeable envelope upon expansion; wherein the adhesive is disposed over the entire inner surface of the liquid-permeable envelope; wherein the adhesive is disposed over less than the entire inner surface of the liquid-permeable envelope; wherein the adhesive is disposed in a pattern on the inner surface of the liquid-permeable envelope; wherein the liquid-absorbing material is characterized in that it absorbs from 50 to 1000 times its weight in liquid; wherein non-adhered liquid-absorbing material is disposed within the liquid-permeable envelope; wherein portions of the liquid-permeable envelope are liquid-impermeable; wherein the liquid-permeable envelope is rectangular; and/or wherein the liquid-permeable envelope is tubular. Alternatively, the invention is a liquid-absorbing barrier bag comprising: a liquid-permeable envelope having an inner surface; an adhesive disposed on the inner surface of the liquid-permeable envelope; and a liquid-absorbing material in powdered or granular form adhered to the inner surface of the liquid-permeable envelope by the adhesive, wherein the liquid-absorbing material is characterized in that it expands upon contact with liquid to form a gel; wherein the liquid-absorbing material is characterized in that it absorbs from 50 to 1000 times its weight in liquid; wherein the adhesive is characterized in that it releases the liquid-absorbing material from the inner surface of the liquid-permeable envelope upon absorption of liquid; and whereby upon expansion of the liquid-absorbing material, passage of liquid through the liquid-absorbing barrier bag is precluded.

DETAILED DESCRIPTION OF THE INVENTION

Figure 1:
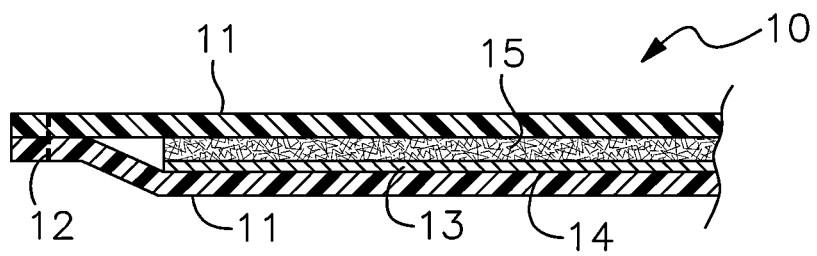
FIG. 1 illustrates in partial cross-section an embodiment of the barrier bag, shown in the dry state, with the absorbent material adhered to one inner wall surface of the envelope.

As used herein, the terms "liquid-absorbing liquid barrier bag", "liquid barrier bag" or "barrier bag" refer in general to articles sometimes referred to as "flood water barrier bags", "sandless sandbags", "water barrier bags" and like terms, wherein the liquid barrier bags function as a barrier to preclude, contain and control movement of a liquid. The term "bag" refers to any article of equivalent structure and function for the intended purpose of the invention, such as an envelope, sack, tube, container, packet, etc., which is liquid-permeable and capable of retaining a liquid absorbent material and expanding upon absorption of a liquid. The term "liquid" refers to any wet fluid, such as water, hydrocarbons, chemicals, hazardous waste, etc.

In general, the invention in various embodiments is a liquid-absorbing, barrier bag 10 for impeding liquid flow comprising a liquid-permeable envelope 11 within which a super-absorbent polymer material 15 in powder or granular form is disposed, the super-super-absorbent material characterized in that it greatly increases in volume upon liquid absorption. Varying amounts of the super-absorbent material 15 is adhered to one or more of the inner surfaces 14 of the wall members of the liquid-permeable envelope 11. The envelope 11 may be single or multilayer and may be formed in various shapes. For example, a rectangular envelope 11 may be formed by joining two or more square or rectangular sheets along all four edges or by folding a single sheet and sealing along the remaining three edges. Sealing means 12 such as stitching, heat sealing, sonic welding or other similar techniques may be used. A tubular envelope 11 may be formed by longitudinally folding a greatly elongated single sheet and sealing the three edges. A tube-within-a-tube may be formed by sealing the width of the tube to create a larger width tube and a smaller width tube from one sheet. The narrower tube helps keep the larger width tube from rolling or moving.

Preferably the entire envelope 11 is formed of an inherently water-permeable material, such as a woven fabric, felt, etc., but the envelope 11 may also be formed as a combination of water-permeable and water-impermeable material. For example, the bottom member of the envelope 11 may be formed of a water-impermeable material which is stronger or more abrasion-resistant than the upper member. Alternatively, the envelope 11 may be formed from a liquid-impermeable material having liquid-permeable areas such as apertures, holes, windows or slots positioned at various locations on the envelope 11. Thus, the material of construction of the envelope 11 may be woven, felted, needled, apertured, slotted, etc. in order to achieve water-permeability. The material of construction of the envelope 11 may be elastic such that expansion into the desired shape is more readily achieved. The material of construction for the envelope 11 may also be of a type which also swells upon contact with liquid.

The super-absorbent material 15 may be of any suitable type in powdered or granular form which is characterized in that it may be adhered to the inner surface 14 of the envelope 11, is of relatively low volume in the dry state as compared to its expanded state, and upon absorbing a liquid significantly swells or expands into a gel or similar characteristics. For example, a representative suitable super-absorbent material 15 may be a polymer or copolymer comprising acrylic acid and/or acrylamide, sodium hydroxide and a cross-linking agent. Other formulations for super-absorbent polymer materials 15 are known and will also be suitable.

The super-absorbent material 15 is most preferably a superabsorbent polymer in powder or granular form characterized in that it absorbs a large amount of liquid, such as preferably from 100 to 1000 times its weight in liquid, the polymer swelling and expanding significantly as the liquid is absorbed. In this manner the volume of barrier bag 10 increases from a generally flat configuration (prior to contact with liquid) to a substantially rectangular, pillow-shaped or elongated configuration (after contact with liquid). By adhering the super-absorbent material 15 to the inner surface or surfaces 14 of the envelope 11, the polymer or other material remains evenly distributed or distributed inside the envelope 11 in a pre-determined pattern during storage, transport and placement. The adhesive used to create the adhesive layer 13 which retains the super-absorbent material 15 is chosen such that during storage, transport and handling prior to contact with liquid the super-absorbent material 15 remains adhered in the desired distribution pattern to the inner surface 14 of the envelope 11, but upon contact with liquid the super-absorbent material 15 releases from the inner surface 14 of the envelope 11. The adhesive layer 13 may be water-soluble, such that the super-absorbent material 15 is released from the inner surface 14 of the envelope 11 upon liquid contact, or water-insoluble but weak-bonding, such that the super-absorbent material 15 physically separates from the inner surface 14 upon swelling.

Figure 2:
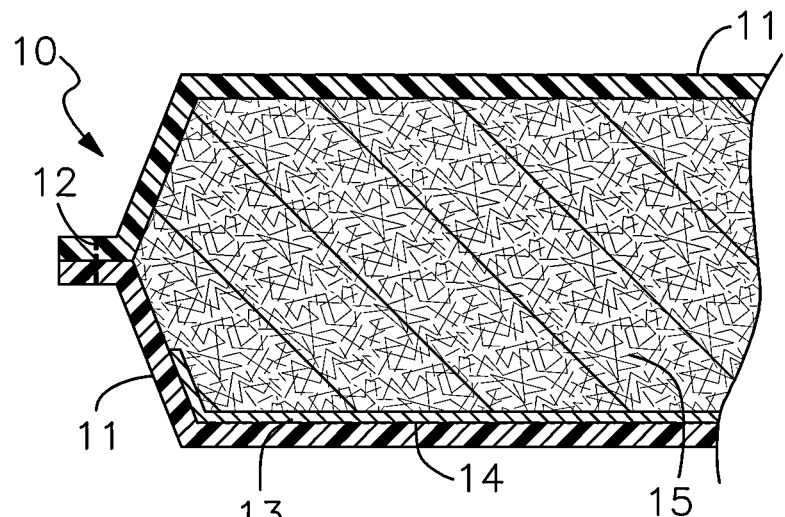
FIG. 2 illustrates the embodiment of FIG. 1 in the wet, expanded state.
Figure 5:
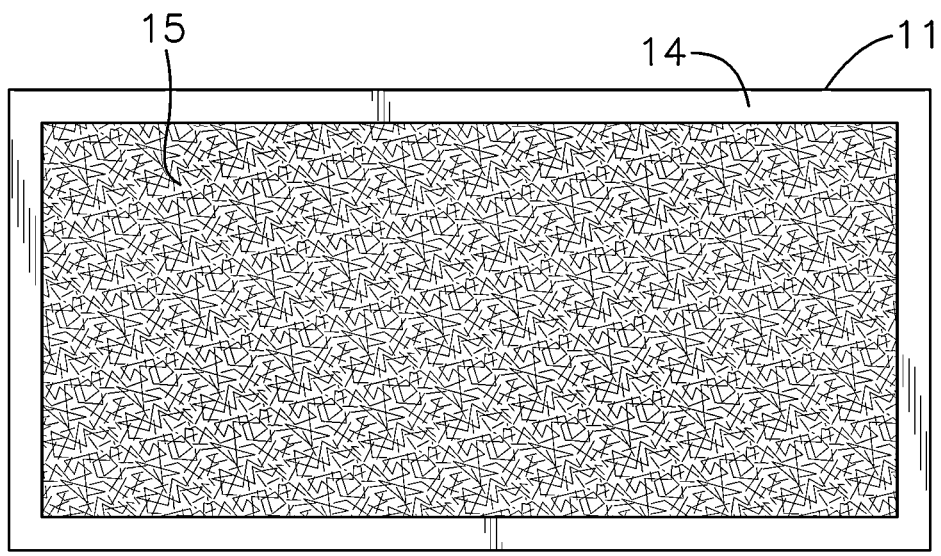
FIG. 5 illustrates an exposed inner wall surface of an embodiment of the liquid barrier bag in the dry state wherein the absorbent material is distributed evenly.
Figure 3:
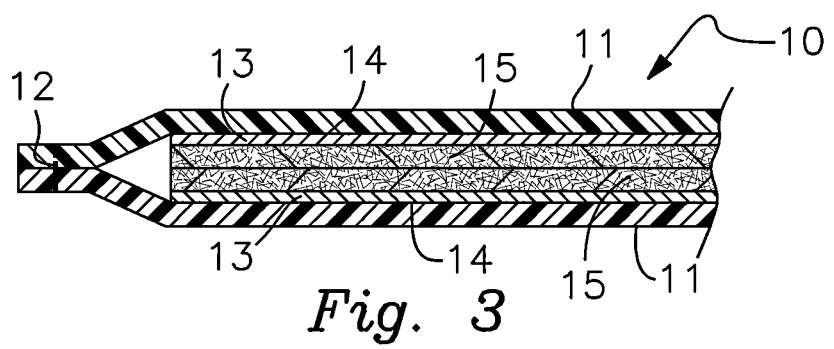
FIG. 3 illustrates in partial cross-section an embodiment of the liquid barrier bag, shown in the dry state, with the absorbent material adhered to both inner wall surfaces of the envelope.
Figure 4:
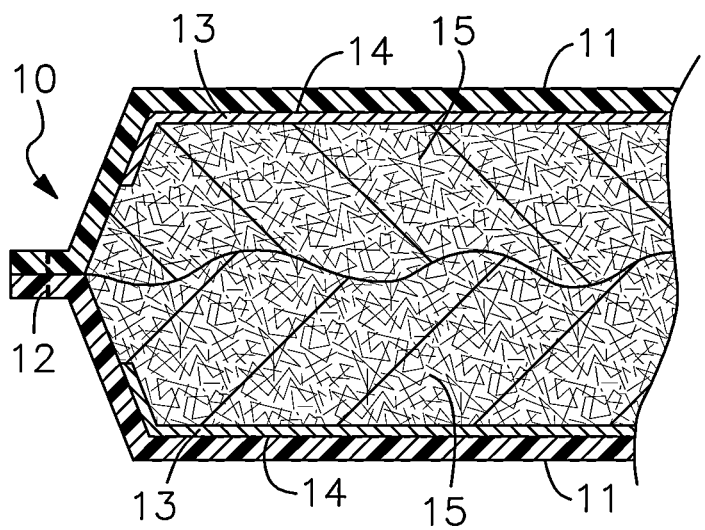
FIG. 4 illustrates the embodiment of FIG. 3 in the wet, expanded state.
Figure 6:
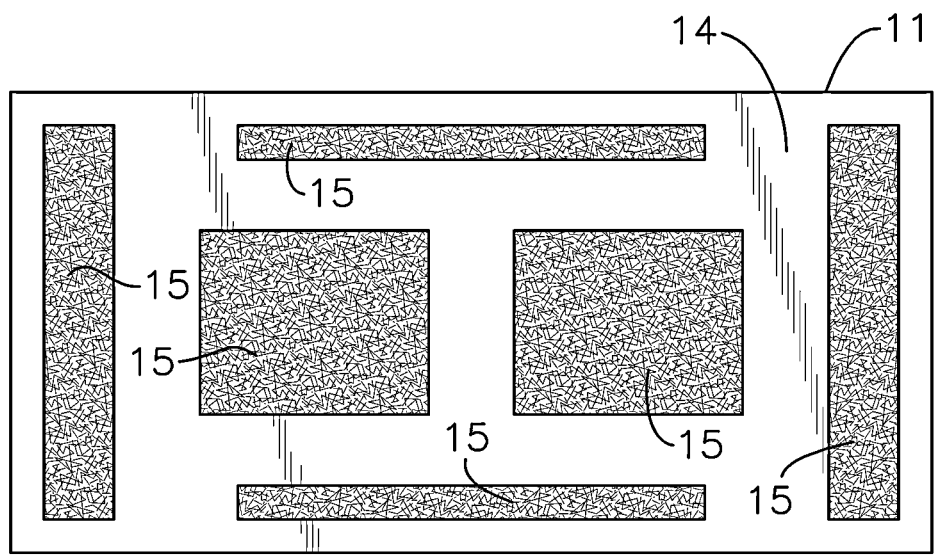
FIG. 6 illustrates an exposed inner wall surface of an embodiment of the liquid barrier bag in the dry state wherein the absorbent material is distributed in a pattern.
Figure 7:
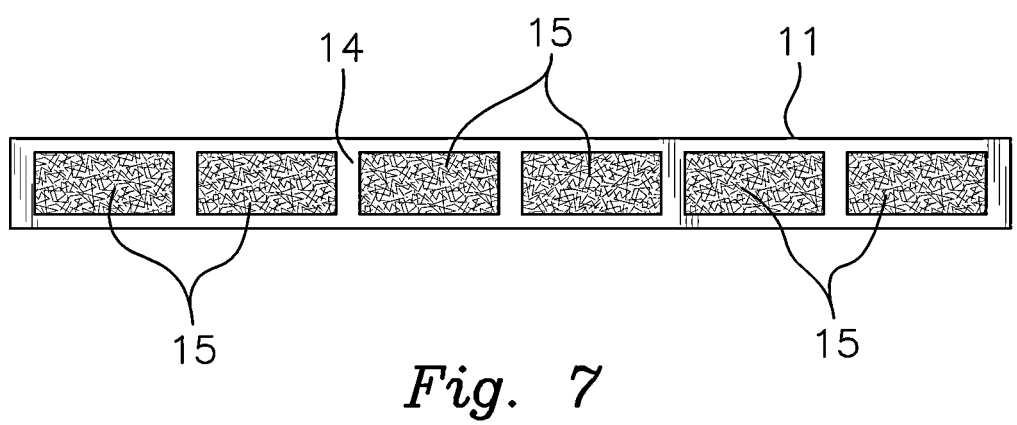
FIG. 7 illustrates an exposed inner wall surface of an elongated tubular embodiment of the liquid barrier bag in the dry state wherein the absorbent material is distributed in a spaced pattern that allows for easy folding of the bag.

The adhesive layer 13 and therefore the super-absorbent material 15 may be distributed in multiple patterns and locations, such as in a single pattern, preferable almost completely coextensive with the inner surface 14 of the envelope 11, as seen in FIG. 5, or alternatively distributed in a pattern of multiple discrete areas when a more controlled swelling configuration is desired, as seen in FIG. 6. The adhesive layer 13 and therefore the super-absorbent material 15 may be distributed on one inner surface 14 of the envelope 11, as seen in FIGS. 1 and 2, or may be distributed on plural inner surfaces 14, as seen in FIGS. 3 and 4. For elongated, tubular envelopes 11 the adhesive layers 13 may be intermittently spaced to allow the tubular envelope 11 to be easily folded for storage and transport, as shown in FIG. 7.

Furthermore, non-adhered super-absorbent material 15 may be placed into the envelope to supplement the super-absorbent material 15 adhered to the adhesive layers 13 if needed to create barrier bags 10 of greater dimensions.

Functionally, a barrier wall is formed by soaking dry barrier bags 10 on site using any available water source, such as by soaking them in a bucket, trash bin, temporary pool or natural body of water, to produce the desired three-dimensional shape for stacking. Enlarged bags 10 of rectangular shape are then stacked to produce a barrier wall or laid end-to-end. Elongated bags or tubes 10 are placed along door bottoms to provide a seal.

Alternatively, in circumstances where the liquid to be dammed, redirected or retained will be slow rising, a plurality of flat, dry barrier bags 10 may be stacked in multiple rows at the desired location for the formation of a barrier wall to retain, redirect or restrict the flow of liquid, with each row preferably offset from its adjacent row in the normal manner for stacking blocks, bricks, sandbags or the like. The bags 10 may be secured in place on the ground surface using stakes, anchors or other means. Once the liquid contacts the barrier bags 10 it passes through the liquid-permeable envelope 11 into the interior of the bag and is absorbed by the super-absorbent material 15. The flat barrier bags 10, as seen in FIGS. 1 and 3, then increase in size in the vertical direction (as stacked) to form a pillow-shaped, tubular or other three-dimensional body, as seen in FIGS. 2 and 4, thereby producing in combination a liquid-impermeable barrier wall of sufficient height to control the liquid in the same style as that of typical sandbags.

It is understood that substitutions or equivalents for elements described and set forth above may be obvious to those of skill in the art, and therefore the true scope and definition of the invention is to be as set forth in the following claims.

We claim:

1. A liquid-absorbing barrier bag comprising:
   a liquid-permeable envelope having an inner surface;
   an adhesive disposed on the inner surface of the liquid-permeable envelope; and
   a liquid-absorbing material adhered to the inner surface of the liquid-permeable envelope by the adhesive, the liquid-absorbing material characterized in that it expands upon contact with liquid;

wherein the adhesive is water-soluble;

whereby upon expansion of the liquid-absorbing material, passage of liquid through the liquid-absorbing barrier bag is precluded.

2. The liquid-absorbing barrier bag of claim 1, wherein the liquid-absorbing material is a powdered or granular material.

3. The liquid-absorbing barrier bag of claim 1, wherein the liquid-absorbing material completely fills the liquid-permeable envelope upon expansion.

4. The liquid-absorbing barrier bag of claim 1, wherein the adhesive is disposed over the entire inner surface of the liquid-permeable envelope.

5. The liquid-absorbing barrier bag of claim 1, wherein the adhesive is disposed over less than the entire inner surface of the liquid-permeable envelope.

6. The liquid-absorbing barrier bag of claim 1, wherein the adhesive is disposed in a pattern on the inner surface of the liquid-permeable envelope.

7. The liquid-absorbing barrier bag of claim 1, wherein the liquid-absorbing material is characterized in that it absorbs from 50 to 1000 times its weight in liquid.

8. The liquid-absorbing barrier bag of claim 1, wherein non-adhered liquid-absorbing material is disposed within the liquid-permeable envelope.

9. The liquid-absorbing barrier bag of claim 1, wherein portions of the liquid-permeable envelope are liquid-impermeable.

10. The liquid-absorbing barrier bag of claim 1, wherein the liquid-permeable envelope is rectangular.

11. The liquid-absorbing barrier bag of claim 1, wherein the liquid-permeable envelope is tubular.

12. A liquid-absorbing barrier bag comprising:

a liquid-permeable envelope having an inner surface;

an adhesive disposed on the inner surface of the liquid-permeable envelope; and a liquid-absorbing material adhered to the inner surface of the liquid-permeable envelope by the adhesive, the liquid-absorbing material characterized in that it expands upon contact with liquid;

wherein the liquid-absorbing material separates from the inner surface of the liquid-permeable envelope upon absorption of liquid;

whereby upon expansion of the liquid-absorbing material, passage of liquid through the liquid-absorbing barrier bag is precluded.

13. A liquid-absorbing barrier bag comprising:

a liquid-permeable envelope having an inner surface;

an adhesive disposed on the inner surface of the liquid-permeable envelope; and a liquid-absorbing material in powdered or granular form adhered to the inner surface of the liquid-permeable envelope by the adhesive, wherein the liquid-absorbing material is characterized in that it expands upon contact with liquid to form a gel;

wherein the liquid-absorbing material is characterized in that it absorbs from 50 to 1000 times its weight in liquid;

wherein the adhesive is characterized in that it releases the liquid-absorbing material from the inner surface of the liquid-permeable envelope upon absorption of liquid; and whereby upon expansion of the liquid-absorbing material, passage of liquid through the liquid-absorbing barrier bag is precluded.

14. The liquid-absorbing barrier bag of claim 12, wherein the liquid-absorbing material is a powdered or granular material.

15. The liquid-absorbing barrier bag of claim 12, wherein the liquid-absorbing material completely fills the liquid-permeable envelope upon expansion.

16. The liquid-absorbing barrier bag of claim 12, wherein the adhesive is disposed over less than the entire inner surface of the liquid-permeable envelope.

17. The liquid-absorbing barrier bag of claim 12, wherein the adhesive is disposed in a pattern on the inner surface of the liquid-permeable envelope.

18. The liquid-absorbing barrier bag of claim 12, wherein the liquid-absorbing material is characterized in that it absorbs from 50 to 1000 times its weight in liquid.

19. The liquid-absorbing barrier bag of claim 12, wherein non-adhered liquid-absorbing material is disposed within the liquid-permeable envelope.

20. The liquid-absorbing barrier bag of claim 12, wherein portions of the liquid-permeable envelope are liquid-impermeable.

* * * * *